Patric & Bickford.
Grain Drill.
Nº 71528.
Patented Nov. 26, 1867.
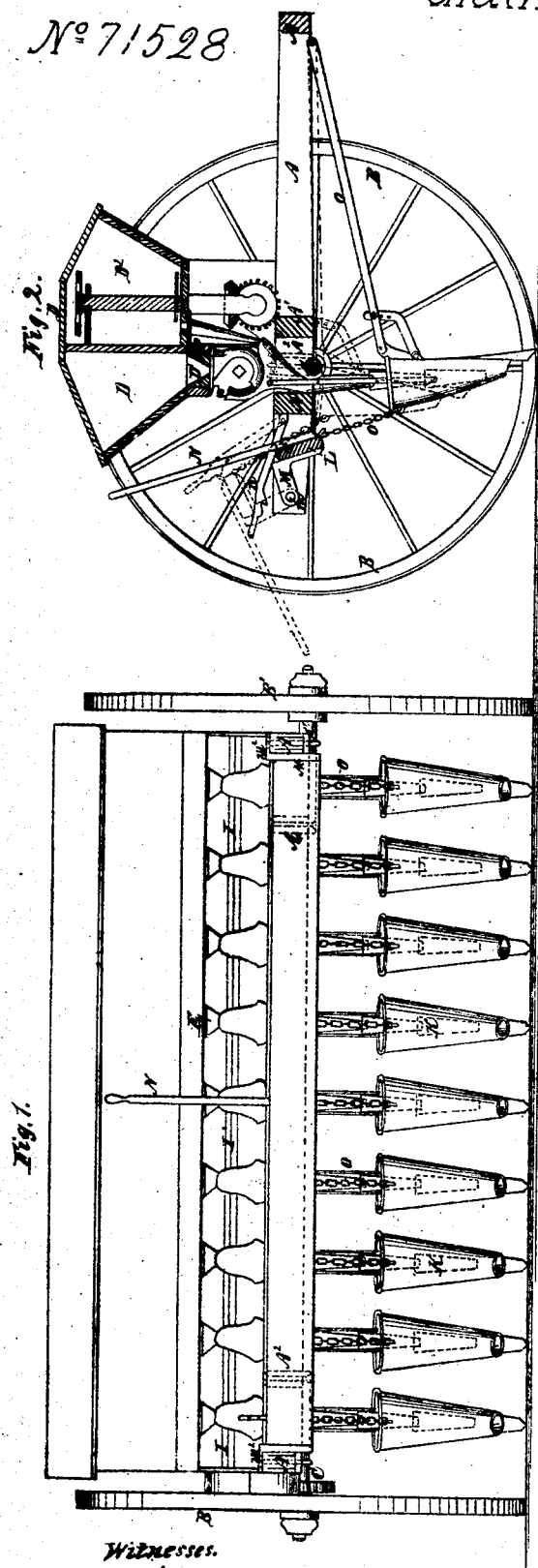
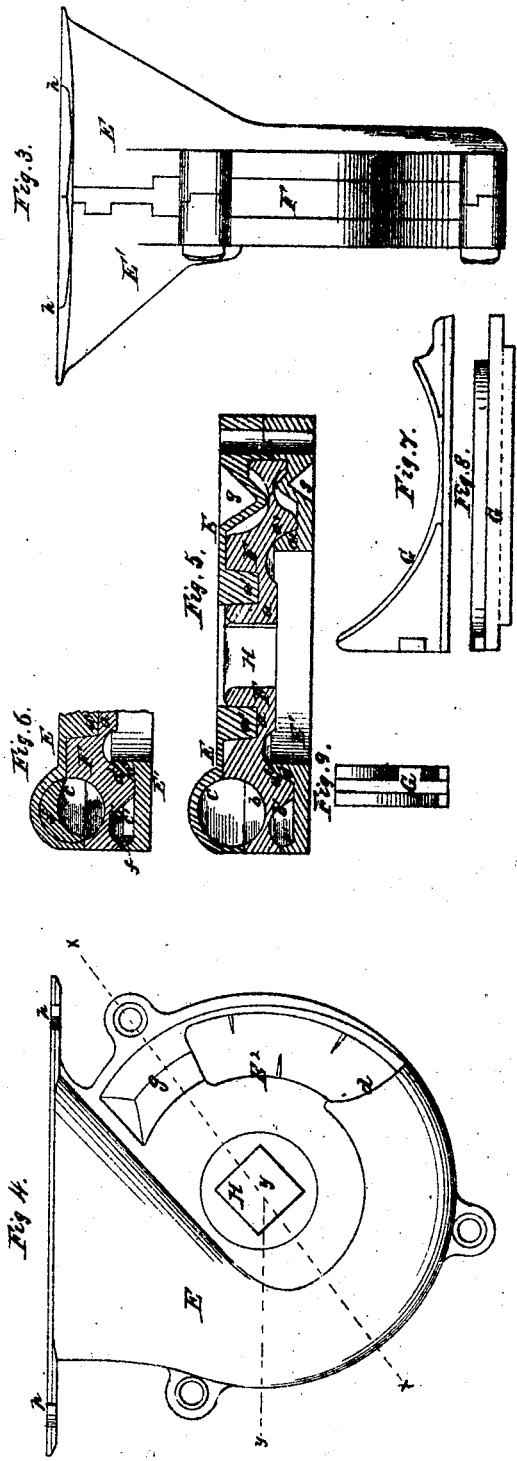
Witnesses.
N. B. Smith.
Alex Mahan.
Inventors.
L. E. Patric
Lyman Bickford
by their Attorney
Addson M Smith

United States Patent Office.

CHARLES E. PATRIC AND LYMAN BICKFORD, OF MACEDON, NEW YORK.

*Letters Patent No. 71,528, dated November 26, 1867.*

---

IMPROVEMENT IN GRAIN-DRILLS.

---

*The Schedule referred to in these Letters Patent and making part of the same.*

---

TO ALL WHOM IT MAY CONCERN:

Be it known that we, CHARLES E. PATRIC and LYMAN BICKFORD, of Macedon, in the county of Wayne, and State of New York, have invented certain new and useful Improvements in Grain-Drills; and we do hereby declare the following to be a full, clear, and exact description thereof, reference being had to the accompanying drawings, in which—

Figure 1 is a rear elevation of a seeding-machine embracing our improvements.

Figure 2 is a vertical longitudinal section of the same.

Figure 3 is a front elevation; and

Figure 4 a side elevation of one of the distributors.

Figure 5 is a sectional view of one of the distributors taken, in line $x\ x$, fig. 4.

Figure 6 is a part section of the same, taken in the line $y\ y$; and

Figures 7, 8, and 9 represent side, plan, and end views of the partition-piece between the distributor-passages or runs.

Similar letters of reference denote corresponding parts in all the figures.

Our invention relates to the construction of the distributors which receive the grain from the hopper and conduct or convey it in the desired quantity to the seed-tubes; also to the construction and arrangement of the "back roller" or lifting-device, and of the short axles of the carrying and driving-wheels, as hereinafter set forth.

To enable others to construct and use our invention, we will describe the same with reference to the drawings, in which, for the purpose of better showing the manner of applying the same, we have shown (in figs. 1 and 2) the several parts in about the relation they assume in practical operation.

A represents the main frame of the machine; B B$^1$ the carrying and driving-wheels mounted on short stationary axles C, which are attached to the outer longitudinal frame-pieces A, and at their inner ends to the short longitudinal ties or bars A$^2$, (see dotted lines, fig. 1,) arranged between the cross-pieces A$^1$ at a short distance from the outer frame-bars A. These axles are secured to the said bars by means of stout bolts and staples, as shown by the drawing, or in any suitable manner; and, being thus made short and light, instead of extending across the frame in the usual manner, may be made of wrought or malleable cast iron, and serve materially to diminish the weight of the machine, and also permit a more central and compact arrangement of the operative parts of the machine than could otherwise be attained.

D is the hopper, mounted upon the frame in the usual manner, and provided with the slide hopper-bottom D$^1$, by the end movement or adjustment of which the grain is directed to either one of two series of distributor-passages or "runs," hereinafter described. The hopper is shown divided, or constructed with a fertilizer-compartment, D$^2$, provided with the necessary discharge-outlet or tube and agitating or stirring-devices, which may be of the usual or any desired construction and arrangement.

E E are the distributors or distributor-cases, arranged, in any desired or usual number, side by side, and attached directly to the hopper-bottom, (see figs. 1 and 2.) The construction of these distributors is better shown in the detached views, figs. 3–9, enlarged to nearly or quite the practical working size, and may be described as follows, viz: The shell or case is divided into two parts, E E$^1$, resembling each other in form, except that the passage or run, or the part thereof formed in part E$^1$, is smaller than that formed in part E. These parts of shell are provided with external, interlocking, perforated lugs or ears $e$, through which, by means of bolts or rivets, they are firmly secured to each other.

F is a grooved distributor-wheel, made in form substantially as shown in fig. 5, having an annular concentric groove, $a$, formed in its enlarged centre or hub, which matches and receives a corresponding annular flange or sleeve, $a^1$, formed or cast upon the shell E, said annular flange or sleeve constituting the axis or bearing upon which the wheel is rotated. The shell E is also provided with an annular hub or flange, $a^2$, which matches a corresponding recess or curved face, $a^3$, formed in wheel F. Said wheel is formed or cast with annular grooves $b\ b^1$, located upon its opposite sides or faces, which oppose or match grooves or passages $c\ c^1$, of corresponding or other suitable form, in the inner faces of the shell-plates E E$^1$, and which constitute the distributor-passages or runs herein referred to. These passages or runs are enlarged or expanded at the top into a funnel-form, with mouths corresponding to the size of the openings in the hopper-slide, and at the line of section $y\ y$, or at any other suitable point between the expanded or hopper-shaped mouth and the point of discharge $d$, are contracted in such manner as to form a throat or gauge, $f$, for regulating the quantity of grain passing through the distributor. This contraction of the run is shown in the sectional view, fig. 6, and consists of a swell or protuberance, $f$, formed or cast on the shell or casing at the desired point, and constitutes a convenient gauge, determining with the utmost precision the quantity delivered to the seed-tubes. At all other points in the length of the distributor-runs the capacity of the run or passage is increased in such manner as to avoid all danger of cracking or crushing the grain. The throat $f$, as before remarked, may be located, as shown in the drawings, at the bottom of the funnel or hopper-shaped mouth, at the point of discharge $d$, or at any intermediate point. This construction will be found particularly serviceable in sowing peas, beans, and other large seed, which are liable to be cracked by machines as ordinarily constructed.

$E^2$ is the discharge-outlet or opening formed in the side of the casings $E\ E^1$, through which the grain is discharged into the expanded upper end or mouth of the conveyor-tubes, whence it is conducted to the drill-teeth, and to the bottom of the furrow formed thereby, in the usual manner.

The distributor-wheel is provided with starts or ribs in the seed-groove or run, of any required number and form, for properly carrying the grain forward to the discharge-openings. Above these discharge-openings a concave depression or sink, $g$, is formed in the shell or case, which enters the run or groove in the wheel, and prevents the grain from being carried beyond the desired point, and insures its discharge at the proper time and place.

G, figs. 7, 8, and 9, is a partition-piece, separating the two runs above the distributor-wheel, and filling in the space between the periphery of said wheel and the hopper-bottom.

H represents the central opening or hole formed in the enlarged hub of the distributor-wheel, made square, as shown, or in other suitable form, to receive and cause it to turn with a driving-shaft, I, to which motion is communicated from the drive-wheel B in any convenient manner.

The upper or top flanges of the distributor-cases, instead of being drilled or perforated, as is usually done, to afford a means of attachment, by screws or their equivalents, to the hopper-bottom, are formed or cast with slots or notches $p$ in them, into which the screws are passed for securing them, thereby avoiding the expense of drilling, facilitating the manufacture, and, in case of breakage of the casing or part thereof, insuring the accurate fitting of a duplicate casting in the place of the broken part, without change of position of the fastenings.

K K are the drill-tubes, made in any usual or desired form, corresponding in number to the number of distributors used, and arranged and drawn forward in the usual manner.

L is a lifting-bar or "back roller," connected at its opposite ends to angle-irons or right-angled levers M, which are pivoted to the rear extensions of the longitudinal side bars or other suitable points in frame A, as shown at $m$, fig. 2, and are provided with horizontal lips or flanges $m^2$, which, when the lifting-bar is in position shown by full lines, figs. 1 and 2, overlap the end extensions of the frame-bars and prevent the bar from swinging too low, keeping it in the proper position to operate upon and elevate the drill-teeth when desired.

N is an arm or lever attached to the lifting-bar for operating it, and $n$ is a latch pivoted to the frame or hopper, which, by catching upon a lip on the lifting-bar, serves to hold it up, when the teeth are raised for transportation or other purposes, in manner shown by red lines, fig. 2.

O O are chains, connected at their lower ends to the drill-teeth, and at their upper ends to the upper front corner of the lifting-bar L, by means of staples, through which the chains can readily slide or pass, and short-handle rods secured to the ends of the chains, by means of which the attendant can raise any one of the drill-teeth separately when required.

By this construction and arrangement it will be seen that when the operator desires to raise the several drill-tubes together, for the purpose of passing an obstruction, or for transportation, by drawing or pressing the lever N back into position, shown in red lines, fig. 2, the chains connected to the upper front corner of the lifting-bar are drawn upward thereby, taking up any slack in the chains and lifting the tubes until said chains rest upon the expanded vertical or nearly vertical face of the bar, when, by the continued movement of the bar in connection with the expanded face thereof, the lifting-arm of the lever becomes elongated, and the chains are crowded forward in such manner as to maintain them in nearly their original angle of relation to the drill-teeth, which rise upon and vibrate about a different centre, viz, the forward pivoted ends of the drag-bars $o$, thereby effecting the elevation by a continuously direct application of the power, which is greatest at about the time the slack of the chains is taken up and the weight of the drill-teeth is added, and avoiding the straining of parts consequent upon the employment of many of the lifting devices in use.

P is a shield or "wind-guard," arranged in front of the distributors, and may be made of sheet metal or wood, in one piece, extending from end to end of the hopper, or in sections, corresponding in number to the number of distributors, if desired, and attached to the hopper or other convenient point in front of the distributors, for the purpose of preventing the grain from being blown out and scattered, as it is discharged from the distributors into the mouths of the conveyer-tubes, which receive and conduct it to the drill-teeth.

Having now described our invention, together with the arrangement and operation of the several parts, what we claim as new, and desire to secure by Letters Patent, is—

1. The distributors, provided with the enlarged seed-runs or passages, having the contracted throat or gauge formed therein, for the purpose set forth.

2. The concave depression or sink formed in the distributor-shell above the discharge-outlet or opening, for the purpose set forth.

3. The upper flanges of the distributor-shell or casings, formed or cast with the slots or notches $p$, substantially as and for the purpose set forth.

4. The manner of forming the axis or bearings of the distributor-wheel, by means of annular flanges and grooves formed in the adjacent faces of the casings and wheel, substantially as described.

5. The vertical distributors, provided with a double feed, and operated by means of a square shaft or its equivalent, in combination with a slide hopper-bottom for adjusting or regulating the feed, as set forth.

6. The "wind-guard" P, in combination with the vertical distributors, applied and operating substantially as described.

7. The lifting-bar L, secured in the described relation to, and in combination with, the angle-irons M, substantially as and for the purpose set forth.

8. The angle-irons M, to which the lifting-bar is attached, provided with the horizontal flanges or stops $m^2$, substantially as and for the purpose set forth.

9. The combination of lifting-bar L, angle-irons M, and lifting-lever N, arranged and operating as described, with the drill-tubes, in the manner and for the purpose set forth.

10. The employment of the short stationary axles C, attached to the outer frame-bars and to the short inner ties or bars $A^2$, in the manner and for the purpose set forth.

CHARLES E. PATRIC,
LYMAN BICKFORD.

Witnesses:
J. C. PARKER,
S. N. GALLUP.